United States Patent
Owens et al.

(10) Patent No.: US 12,363,779 B2
(45) Date of Patent: Jul. 15, 2025

(54) CONNECTION SEQUENCING INVOLVING AUTOMATED ASSISTANTS AND PERIPHERAL DEVICES

(71) Applicant: GOOGLE LLC, Mountain View, CA (US)

(72) Inventors: Irvin Owens, Alameda, CA (US); Jacky Cheung, Palo Alto, CA (US); Xinyu Weng, Cupertino, CA (US)

(73) Assignee: GOOGLE LLC, Mountain View, CA (US)

( * ) Notice: Subject to any disclaimer, the term of this patent is extended or adjusted under 35 U.S.C. 154(b) by 359 days.

(21) Appl. No.: 17/991,267

(22) Filed: Nov. 21, 2022

(65) Prior Publication Data

US 2024/0172304 A1 May 23, 2024

(51) Int. Cl.
| | |
|---|---|
| H04L 29/08 | (2006.01) |
| H04L 65/1069 | (2022.01) |
| H04L 65/403 | (2022.01) |
| H04W 76/15 | (2018.01) |
| H04W 4/80 | (2018.01) |

(52) U.S. Cl.
CPC ......... *H04W 76/15* (2018.02); *H04L 65/1069* (2013.01); *H04L 65/403* (2013.01); *H04W 4/80* (2018.02)

(58) Field of Classification Search
CPC ... H04W 76/15; H04L 65/1069; H04L 65/403
USPC ......................................... 455/414
See application file for complete search history.

(56) References Cited

U.S. PATENT DOCUMENTS

| | | | | |
|---|---|---|---|---|
| 9,032,106 | B2* | 5/2015 | Hutchings | G06F 9/4451 710/8 |
| 9,497,580 | B1* | 11/2016 | Cudak | H04W 4/21 |
| 10,165,613 | B2* | 12/2018 | Lee | H04W 4/80 |
| 11,129,226 | B2 | 9/2021 | Boccon-Gibod et al. | |
| 11,671,809 | B2* | 6/2023 | Srivatsa | H04W 76/14 455/41.2 |
| 2009/0298428 | A1 | 12/2009 | Shin | |

(Continued)

OTHER PUBLICATIONS

European Patent Office; International Search Report and Written Opinion issued in Application No. PCT/US2022/051670; 14 pages; dated Jul. 25, 2023.

*Primary Examiner* — Marceau Milord
(74) *Attorney, Agent, or Firm* — Gray Ice Higdon

(57) ABSTRACT

Implementations set forth herein relate to sequencing connections between a peripheral device and two or more applications, which can include an automated assistant application. The connections can be sequenced such that an application designated for the peripheral device is prioritized over the automated assistant application when the peripheral device becomes available for connecting with the applications. The designated application can be, for example, a streaming application that is designated for a media streaming peripheral device, or a health application for a health monitoring peripheral device. The designated application can connect with the peripheral device via a Bluetooth Classic protocol, and thereafter provide, to other applications, an indication that confirms completion of the Bluetooth Classic connection. The other applications can, in response, initiate connecting with the peripheral device via the Bluetooth Classic protocol or Bluetooth Low Energy protocol.

20 Claims, 6 Drawing Sheets

(56) References Cited

U.S. PATENT DOCUMENTS

2018/0103499 A1\* 4/2018 Lee ................... H04W 76/15
2020/0288303 A1 9/2020 Owens et al.

\* cited by examiner

CONNECTION SEQUENCING INVOLVING AUTOMATED ASSISTANTS AND PERIPHERAL DEVICES

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e., utterances), which may in some cases be converted into text and then processed, and/or by providing textual (e.g., typed) natural language input.

In some instances, a user may interact with an automated assistant through a peripheral device, such as a smart watch, a vehicle interface, an exercise device (e.g., an exercise bike), and/or any other suitable device. However, establishing a connection between a peripheral device and another computing device can be problematic for the automated assistant when other applications are available for connecting with the peripheral device. For example, an exercise application provided by a manufacturer of an exercise bike may attempt to connect to the exercise bike, via Bluetooth, when the computing device (e.g., a cellular phone) is close enough to the exercise bike. However, the automated assistant of the computing device may simultaneously attempt to connect with the exercise bike, which can result in both connection attempts being delayed or otherwise failing. This can be especially problematic when some applications connect via different protocols, such as Bluetooth Classic and Bluetooth Low Energy (BLE). For example, when an interruption to a Bluetooth Classic connection occurs, application processes relying on a BLE connection may also be interrupted because of applications being generically notified of connection interruptions. As a result, certain application processes may be repeated and/or certain data may not be realized, thereby causing computational resources, such as processing bandwidth and memory, to be inefficiently utilized.

SUMMARY

Implementations set forth herein relate to an automated assistant that operates to connect to peripheral devices according to a sequencing process. When the sequencing process involves connecting to another computing device, the sequencing process can prioritize connecting to a native application of the other computing device over the automated assistant. In this way, when a peripheral device provides a communication to the computing device for initializing pairing, applications of the computing device can connect to the peripheral device according to a particular priority. In some implementations, certain devices can also be prioritized according to a particular sequencing process when multiple devices are available for connecting to a computing device. Thereafter, when a particular device disconnects from the computing device, a disconnection sequence can also be implemented to ensure that certain application services are prevented from reconnecting until a particular connection sequence is initiated.

For example, a peripheral device can include a heartbeat monitor that attaches to a wrist of a user and connects to a computing device of the user via Bluetooth Low Energy (BLE). The computing device can be a smart phone that includes multiple different applications, such as a health application, which can be a native or designated application for the heartbeat monitor, and an automated assistant application. In some implementations, the heartbeat monitor can accept inputs from the user (e.g., a tap input from the user) at an interface of the heartbeat monitor for invoking the automated assistant, and can render outputs from the automated assistant at another interface (e.g., a display interface) of the heartbeat monitor. Such behaviors of the automated assistant can be effectuated by allowing an instance of the automated assistant application to communicate via BLE to another instance of the automated assistant application at the smart phone. Similarly, an instance of the health application can be executing at the heartbeat monitor, and another instance of the health application can be executing at the smart phone. The smart phone can communicate via BLE with the heartbeat monitor for facilitating certain features of the heartbeat monitor.

When the heartbeat monitor is powered on, or otherwise becomes available for connecting with the smart phone, the heartbeat monitor can transmit a beacon, or other data, for indicating that the heartbeat monitor is available for connecting with another device (e.g., the smart phone). When the smart phone detects the beacon from the heartbeat monitor, the smart phone can provide Bluetooth availability data to applications of the smart phone. In some implementations, an automated assistant application of the smart phone can be preconfigured to limit attempting to connect to the available Bluetooth device (e.g., the heartbeat monitor) until a native application of the Bluetooth device (e.g., the health application) indicates that the native application has connected to the Bluetooth device. In other words, the automated assistant will bypass or delay connecting to the heartbeat monitor until the health application or the heartbeat monitor indicates, to the automated assistant, that the health application successfully connected to the heartbeat monitor. In this way, errors generated when establishing multiple application connections can be mitigated by requiring one or more applications to connect according to a particular sequence.

In some implementations, sequencing of connections and/or disconnections can occur for peripheral devices that operate multiple Bluetooth protocols, such as Bluetooth Classic and BLE. A peripheral device such as, but not limited to a smart watch or exercise device, can connect to certain applications and/or devices via Bluetooth Classic and/or BLE according to the services that may be effectuated by the peripheral device. For example, a smart watch can connect to a native smart watch application of a computing device via a Bluetooth Classic protocol, and also connect to a health application and an automated assistant via a BLE protocol. In some implementations, when the smart watch has provided a beacon for connecting to the computing device (e.g., a smart phone), the health application and the automated assistant can receive, from an operating system of the computing device, an indication of the availability of the smart watch. In response, and based on one or more characteristics of the indication and/or the smart watch, the health application can avoid attempting to connect to connect to the smart watch until the native smart watch application has connected to the computing device via Bluetooth Classic. In this way, when the native smart watch application has a particular encrypted connection to establish between the smart watch and the computing device, the encrypted connected can be established before other connection requests are processed. Thereafter, once the native smart watch application indicates that the Bluetooth Classic connection has been established, the native smart watch application can communicate with the health application and/or the automated assistant of the computing device. In response, the health application can provide a connection request to the smart watch, followed by the automated assistant providing a separate connection request to the smart watch.

In some implementations, each device can contribute to state machine data managed by a state machine that is available to devices that are connected to each other. The state machine can be a module and/or other executable portion of state machine data that characterizes a connection status and/or a connection priority of each device and/or application that is available for connecting to another device. For example, a computing device, such as a smart phone, can include a state machine with default settings for sequencing the connection of certain applications to certain peripheral devices. For instance, the state machine can, by default, prioritize any native applications of peripheral devices over the automated assistant application. Information managed by the state machine can then be shared with any peripheral device that is attempting to securely connect with the computing device, thereby ensuring that any peripheral device also follows the same priorities and sequences.

In some implementations, a connection sequence established by a particular state machine can be determined, by an operating system and/or other application available at a computing device, according to a context of the computing device. For example, a sequence for connecting applications to a particular peripheral device can be different for other peripheral devices that the applications can connect to. Alternatively, or additionally, a sequence for connecting and/or disconnecting applications to a particular peripheral device with a particular interface profile (e.g., a hands-free profile) can be implemented. As an example, an automated assistant can connect with earbuds according to a first profile (e.g., a hands-free profile or a media streaming profile) but connect with a smart watch according to a second profile (e.g., a profile that permits touch inputs and hands-free inputs). When the earbuds are no longer in user by the user (e.g., the user has put the earbuds back in their case), the earbuds and/or earbuds case can provide a disconnect beacon, for the hands-free profile, to any applications and/or devices that had been using the hands-free profile with the earbuds. In response, each application and/or device can follow a protocol for disconnecting any applications and/or device from the earbuds without affecting any other profiles that are being utilized. For example, the hands-free profile for the earbuds can employ the Bluetooth Classic protocol, but another profile, such as a diagnostics profile, can employ BLE for communicating battery status updates from the earbuds and/or their case to any relevant devices and/or applications. In this way, applications utilizing the hands-free profile for the earbuds can follow a particular sequence when disconnecting from the hands-free profile for the earbuds, while maintaining a connection with the diagnostics profile. For instance, when a profile that utilizes Bluetooth Classic is no longer available for streaming music from a music application and communicating with an automated assistant, the music application and the automated assistant can maintain a relatively uninterrupted connection for providing earbud charge information via an application interface, using a profile that utilizes BLE.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
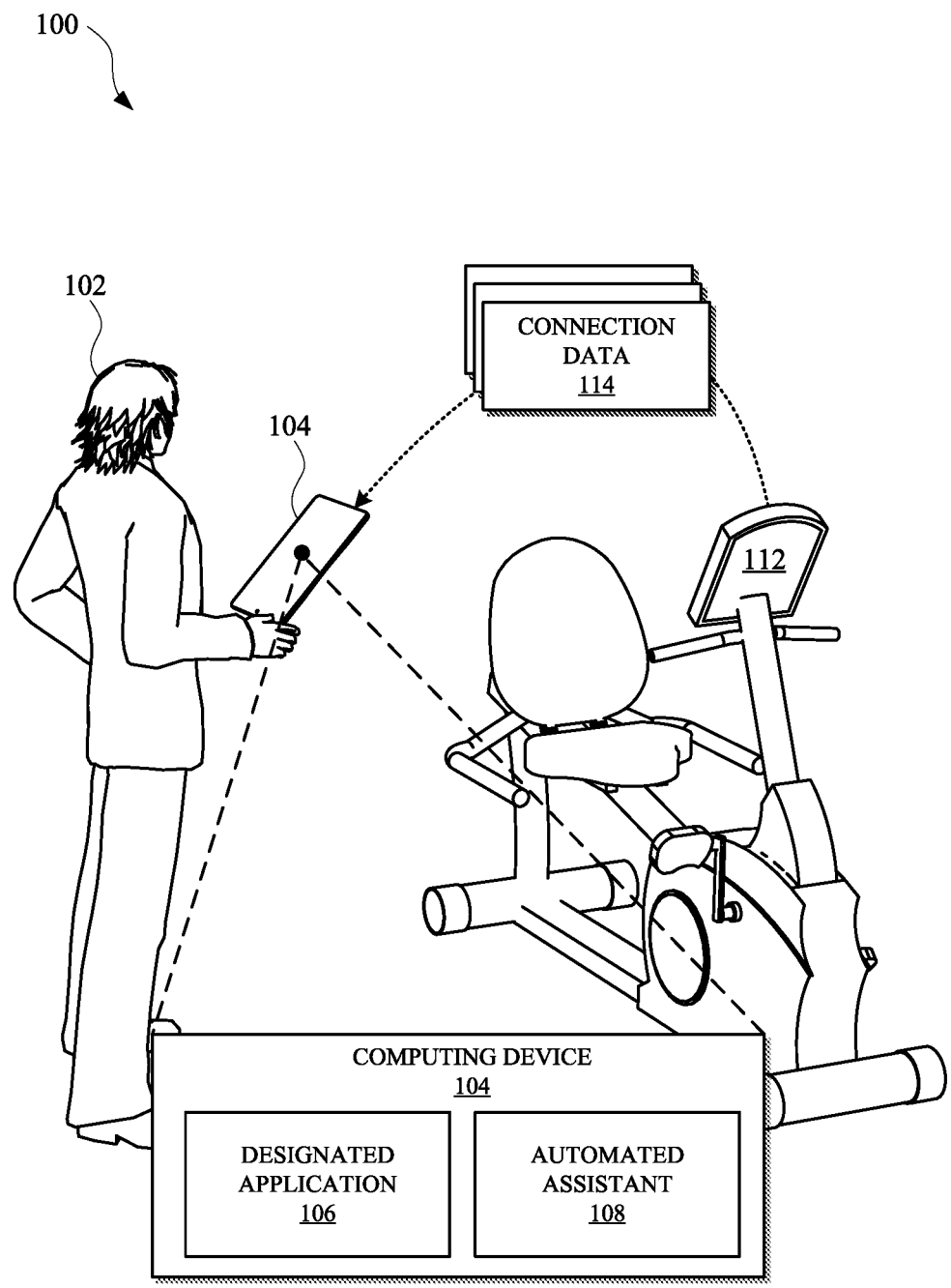
FIG. 1A, FIG. 1B, and FIG. 1C illustrate views of a connection sequence being employed for an automated assistant and one or more other applications that are connecting to a peripheral device.
Figure 1B:
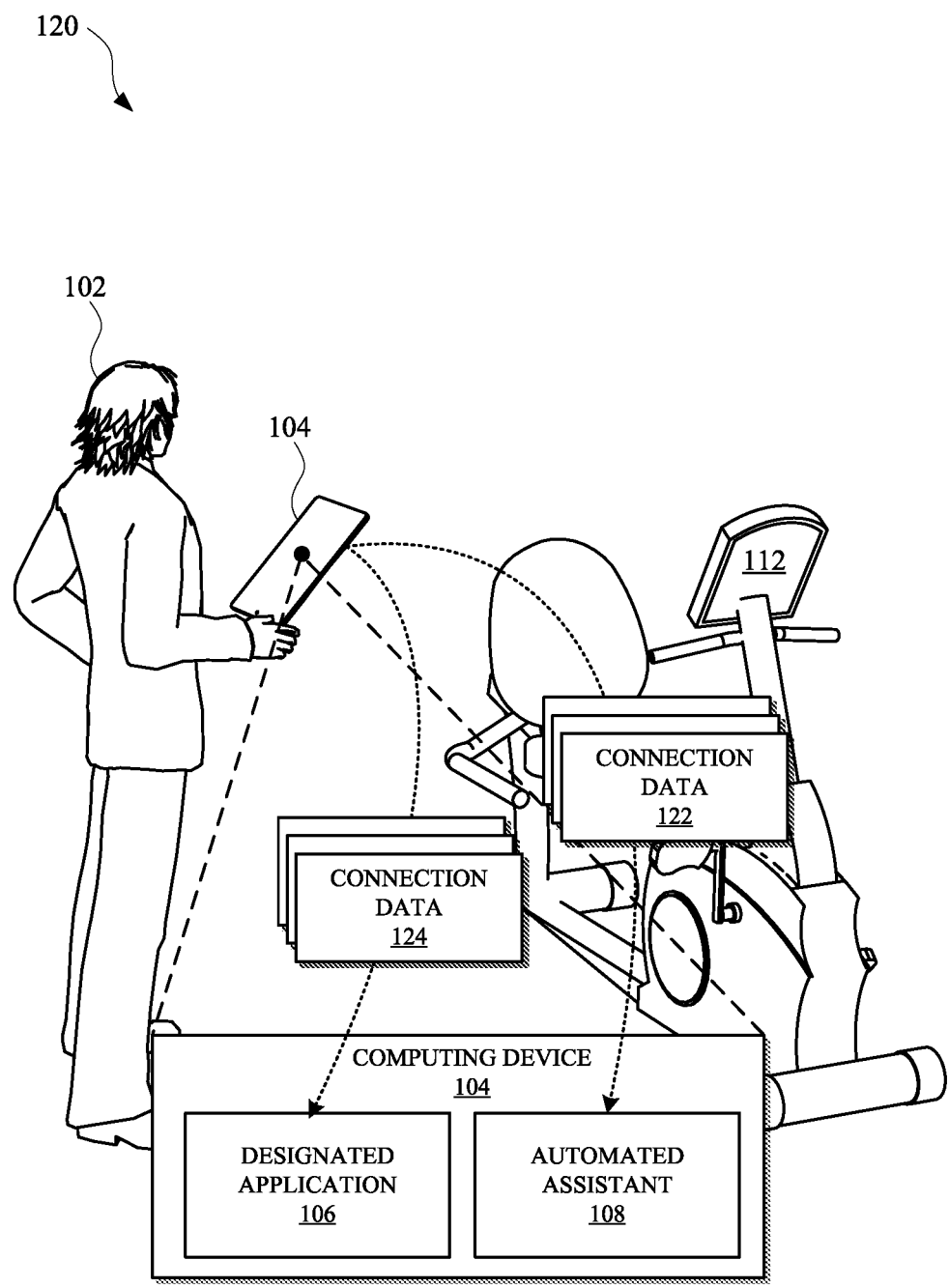
Figure 1C:
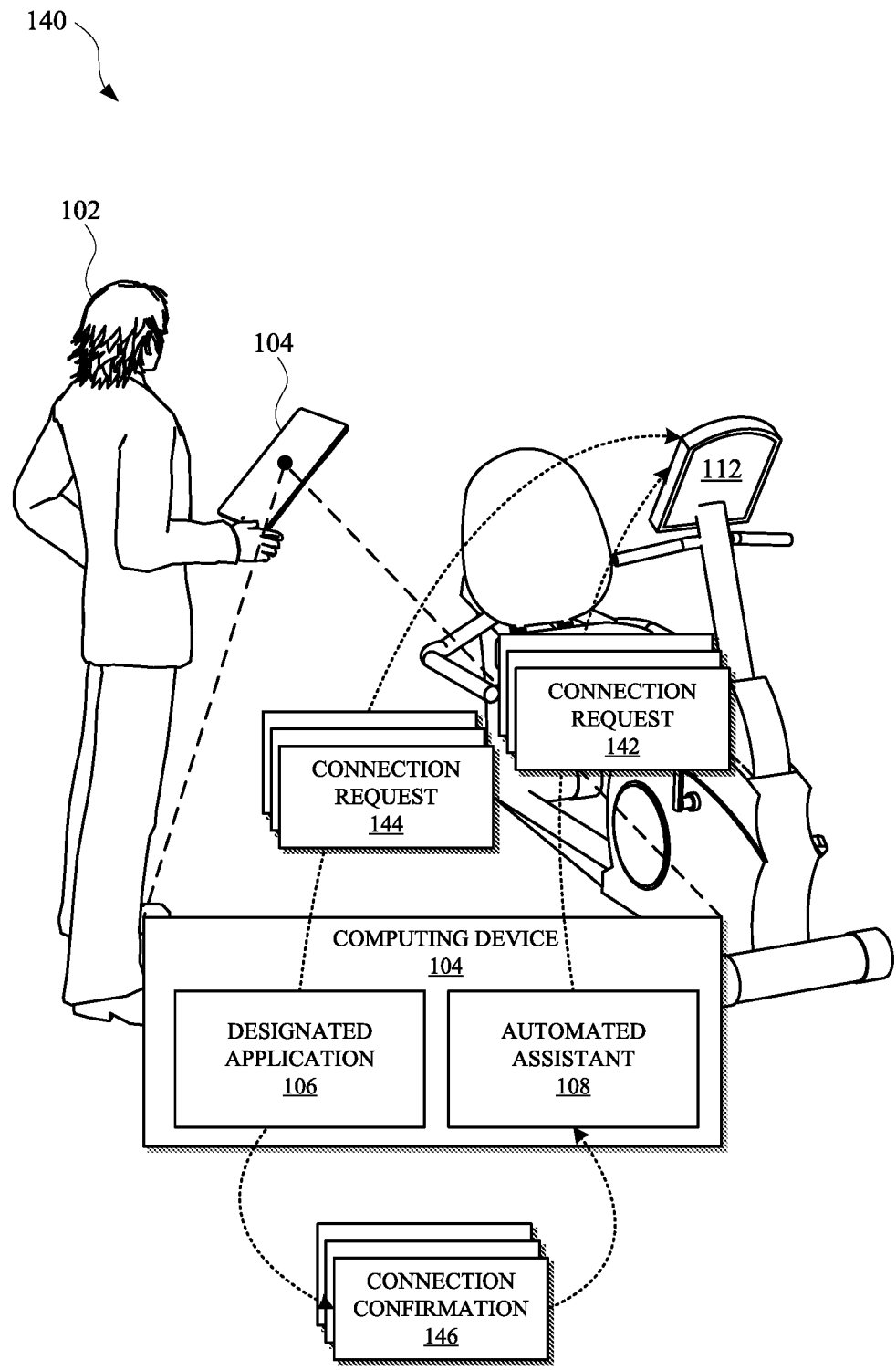

FIG. 1A, FIG. 1B, and FIG. 1C illustrate a view 100, a view 120, and a view 140 of a connection sequence being employed for an automated assistant 108 and one or more other applications that are connecting to a peripheral device 112. The automated assistant 108 can be an application that is accessible via a computing device 104, which can include one or more other applications loaded thereon. The one or more applications can include, for example, a designated application 106 that can be provided by an entity that also provides the peripheral device 112. For instance, the peripheral device 112 can be an exercise bicycle with an integral computing device, and the designated application 106 can be a health monitoring application that was developed by the same entity that developed the exercise bicycle. In such instances, the designated application 106 can process peripheral device data generated by the peripheral device 112, and can allow other applications of the computing device 104 to access the peripheral device data and/or any other data resulting from the processing of the peripheral device data.

In some implementations, when a user 102 relocates the computing device 104 to be within a distance of the peripheral device 112 for connecting with the peripheral device 112, the peripheral device 112 can be communicating connection data 114 to the peripheral device 112. The connection data 114 can be a beacon that is communicated by the peripheral device 112 to indicate, to nearby devices, that the peripheral device 112 is capable of connecting with certain devices via certain communication protocols (e.g., a first communication protocol, a second communication protocol, etc.). When the computing device 104 receives the beacon, an operating system or other application of the computing device 104 can determine whether there is a designated application 106 for the peripheral device 112. When the designated application 106 is available at the computing device 104, the designated application 106 can be prioritized over other applications for connecting to the peripheral device 112.

For example, and as illustrated in FIG. 1B, connection data 124 can be generated for instructing the designated application 106 to be connected to the peripheral device 112 before any other application is connected to the peripheral device 112. In some implementations, the connection data 124 can be executed at the peripheral device 112 and/or at the computing device 104 to cause the designated application 106 to connect with the peripheral device 112. In some implementations, connection data 122 can also be communicated to one or more other applications of the computing device 104, such as an automated assistant 108. This connection data 122 can include connection sequence data that directs the automated assistant to request to connect with the peripheral device 112 only after the designated application 106 has completed connecting with the peripheral device 112. In some implementations, the connection data 122 and the connection data 124 can be provided by the peripheral device 112 and/or the designated application 106. Alternatively, or additionally, instances of connection data can be generated at the computing device 104, and can be adapted over time according to the applications that are available at the computing device 104.

When each application has received the connection data, a prioritized application can begin connecting with the peripheral device 112. For example, and as illustrated in FIG. 1C, the designated application 106 can be the prioritized application that initially provides a connection request 144 to the peripheral device 112. In some implementations, the connection request 144 can be provided via a Bluetooth Classic protocol for establishing a communications channel (e.g., a first communication channel) between the designated application 106 and the peripheral device 112. When the peripheral device 112 has completed connecting with the designated application 106, the peripheral device 112, the designated application 106, and/or the computing device 104 can communicate a connection confirmation 146 to one or more other applications that may connect with the peripheral device 112. In some implementations, the connection confirmation 146 can include connection sequence data that indicates a sequence in which each application should connect with the peripheral device 112.

In some implementations, the designated application 106 and/or the computing device 104 can communicate the connection confirmation 146 to an automated assistant 108 to cause the automated assistant 108 to initialize connecting with the peripheral device 112. In some implementations, the connection confirmation 146 can be communicated over a separate channel (e.g., a second communication channel such as a separate Bluetooth channel) from a channel that the designated application 106 connected with the peripheral device 112. In some implementations, the connection confirmation 146 can be communicated over a different communication modality (e.g., Wi-Fi) than a communication modality (e.g., Bluetooth) that the designated application 106 connected with the peripheral device 112. In response to receiving the connection request 144, or otherwise determining that the prioritized application has connected with the peripheral device 112, the automated assistant 108 can initialize connecting with the peripheral device 112. For example, the automated assistant 108 can provide a connection request 142 to the peripheral device 112 via a separate communication channel than the connection request 144 was provided to the peripheral device 112. By sequencing connections in this way, applications can connect with the peripheral device 112 in a manner that mitigates interruptions to connections and reduces connection timeouts.

Figure 2:
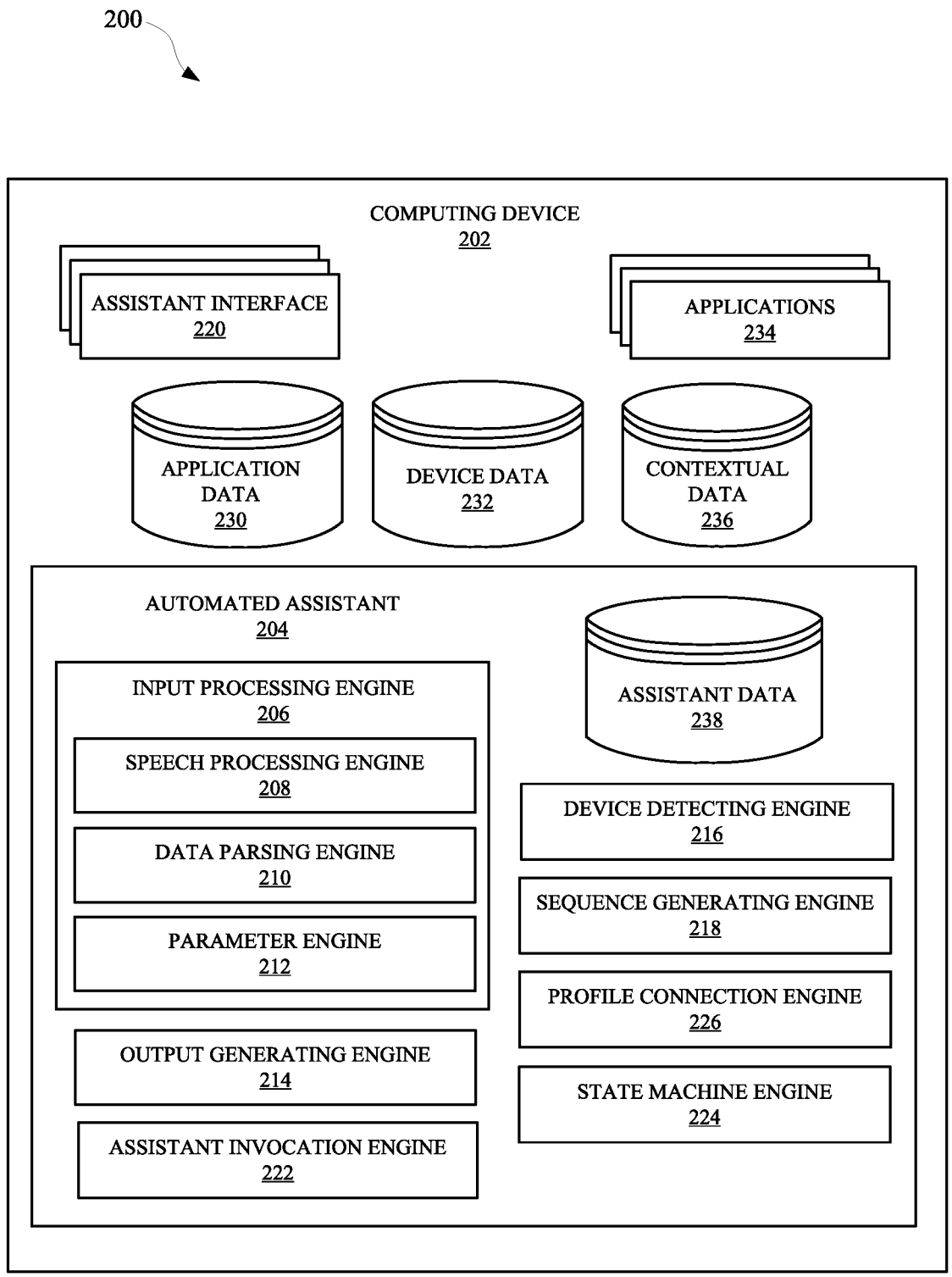
FIG. 2 illustrates a system for operating an automated assistant that will connect with a peripheral device according to a sequence that can prioritize a designated application for the peripheral device.

FIG. 2 illustrates a system 200 for operating an automated assistant 204 that will connect with a peripheral device according to a sequence that can prioritize a designated application for the peripheral device. The automated assistant 204 can operate as part of an assistant application that is provided at one or more computing devices, such as a computing device 202 and/or a server device. A user can interact with the automated assistant 204 via assistant interface(s) 220, which can be a microphone, a camera, a touch screen display, a user interface, and/or any other apparatus capable of providing an interface between a user and an application. For instance, a user can initialize the automated assistant 204 by providing a verbal, textual, and/or a graphical input to an assistant interface 220 to cause the automated assistant 204 to initialize one or more actions (e.g., provide data, control a peripheral device, access an agent, generate an input and/or an output, etc.). Alternatively, the automated assistant 204 can be initialized based on processing of contextual data 236 using one or more trained machine learning models. The contextual data 236 can characterize one or more features of an environment in which the automated assistant 204 is accessible, and/or one or more features of a user that is predicted to be intending to interact with the automated assistant 204. The computing device 202 can include a display device, which can be a display panel that includes a touch interface for receiving touch inputs and/or gestures for allowing a user to control applications 234 of the computing device 202 via the touch interface. In some implementations, the computing device 202 can lack a display device, thereby providing an audible user interface output, without providing a graphical user interface output. Furthermore, the computing device 202 can provide a user interface, such as a microphone, for receiving spoken natural language inputs from a user. In some implementations, the computing device 202 can include a touch interface and can be void of a camera, but can optionally include one or more other sensors.

The computing device 202 and/or other third party client devices can be in communication with a server device over a network, such as the Internet. Additionally, the computing device 202 and any other computing devices can be in communication with each other over a local area network (LAN), such as a Wi-Fi network. The computing device 202 can offload computational tasks to the server device in order to conserve computational resources at the computing device 202. For instance, the server device can host the automated assistant 204, and/or computing device 202 can transmit inputs received at one or more assistant interfaces 220 to the server device. However, in some implementations, the automated assistant 204 can be hosted at the computing device 202, and various processes that can be associated with automated assistant operations can be performed at the computing device 202.

In various implementations, all or less than all aspects of the automated assistant 204 can be implemented on the computing device 202. In some of those implementations, aspects of the automated assistant 204 are implemented via the computing device 202 and can interface with a server device, which can implement other aspects of the automated assistant 204. The server device can optionally serve a plurality of users and their associated assistant applications via multiple threads. In implementations where all or less than all aspects of the automated assistant 204 are implemented via computing device 202, the automated assistant 204 can be an application that is separate from an operating system of the computing device 202 (e.g., installed "on top" of the operating system)—or can alternatively be implemented directly by the operating system of the computing device 202 (e.g., considered an application of, but integral with, the operating system).

In some implementations, the automated assistant 204 can include an input processing engine 206, which can employ multiple different modules for processing inputs and/or outputs for the computing device 202 and/or a server device. For instance, the input processing engine 206 can include a speech processing engine 208, which can process audio data received at an assistant interface 220 to identify the text embodied in the audio data. The audio data can be transmitted from, for example, the computing device 202 to the server device in order to preserve computational resources at the computing device 202. Additionally, or alternatively, the audio data can be exclusively processed at the computing device 202.

The process for converting the audio data to text can include a speech recognition algorithm, which can employ neural networks, and/or statistical models for identifying groups of audio data corresponding to words or phrases. The text converted from the audio data can be parsed by a data parsing engine 210 and made available to the automated assistant 204 as textual data that can be used to generate and/or identify command phrase(s), intent(s), action(s), slot value(s), and/or any other content specified by the user. In some implementations, output data provided by the data parsing engine 210 can be provided to a parameter engine 212 to determine whether the user provided an input that corresponds to a particular intent, action, and/or routine capable of being performed by the automated assistant 204 and/or an application or agent that is capable of being accessed via the automated assistant 204. For example, assistant data 238 can be stored at the server device and/or the computing device 202, and can include data that defines one or more actions capable of being performed by the automated assistant 204, as well as parameters necessary to perform the actions. The parameter engine 212 can generate one or more parameters for an intent, action, and/or slot value, and provide the one or more parameters to an output generating engine 214. The output generating engine 214 can use the one or more parameters to communicate with an assistant interface 220 for providing an output to a user, and/or communicate with one or more applications 234 for providing an output to one or more applications 234.

In some implementations, the automated assistant 204 can be an application that can be installed "on-top of" an operating system of the computing device 202 and/or can itself form part of (or the entirety of) the operating system of the computing device 202. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 202. The on-device speech recognition generates recognized text for a spoken utterance (if any) present in the audio data. Also, for example, on-device natural language understanding (NLU) can be performed using an on-device NLU module that processes recognized text, generated using the on-device speech recognition, and optionally contextual data, to generate NLU data.

NLU data can include intent(s) that correspond to the spoken utterancse and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 202 can include one or more applications 234 which can be provided by a third-party entity that is different from an entity that provided the computing device 202 and/or the automated assistant 204. An application state engine of the automated assistant 204 and/or the computing device 202 can access application data 230 to determine one or more actions capable of being performed by one or more applications 234, as well as a state of each application of the one or more applications 234 and/or a state of a respective device that is associated with the computing device 202. A device state engine of the automated assistant 204 and/or the computing device 202 can access device data 232 to determine one or more actions capable of being performed by the computing device 202 and/or one or more devices that are associated with the computing device 202. Furthermore, the application data 230 and/or any other data (e.g., device data 232) can be accessed by the automated assistant 204 to generate contextual data 236, which can characterize a context in which a particular application 234 and/or device is executing, and/or a context in which a particular user is accessing the computing device 202, accessing an application 234, and/or any other device or module.

While one or more applications 234 are executing at the computing device 202, the device data 232 can characterize a current operating state of each application 234 executing at the computing device 202. Furthermore, the application data 230 can characterize one or more features of an executing application 234, such as content of one or more graphical user interfaces being rendered at the direction of one or more applications 234. Alternatively, or additionally, the application data 230 can characterize an action schema, which can be updated by a respective application and/or by the automated assistant 204, based on a current operating status of the respective application. Alternatively, or additionally, one or more action schemas for one or more applications 234 can remain static, but can be accessed by the application state engine in order to determine a suitable action to initialize via the automated assistant 204.

The computing device 202 can further include an assistant invocation engine 222 that can use one or more trained machine learning models to process application data 230, device data 232, contextual data 236, and/or any other data that is accessible to the computing device 202. The assistant invocation engine 222 can process this data in order to determine whether or not to wait for a user to explicitly speak an invocation phrase to invoke the automated assistant 204, or consider the data to be indicative of an intent by the user to invoke the automated assistant—in lieu of requiring the user to explicitly speak the invocation phrase. For example, the one or more trained machine learning models can be trained using instances of training data that are based on scenarios in which the user is in an environment where multiple devices and/or applications are exhibiting various operating states. The instances of training data can be generated in order to capture training data that characterizes contexts in which the user invokes the automated assistant and other contexts in which the user does not invoke the automated assistant. When the one or more trained machine learning models are trained according to these instances of training data, the assistant invocation engine 222 can cause the automated assistant 204 to detect, or limit detecting, spoken invocation phrases from a user based on features of a context and/or an environment. Additionally, or alternatively, the assistant invocation engine 222 can cause the automated assistant 204 to detect, or limit detecting for one or more assistant commands from a user based on features of a context and/or an environment. In some implementations, the assistant invocation engine 222 can be disabled or limited based on the computing device 202 detecting an assistant suppressing output from another computing device. In this way, when the computing device 202 is detecting an assistant suppressing output, the automated assistant 204 will not be invoked based on contextual data 236—which would otherwise cause the automated assistant 204 to be invoked if the assistant suppressing output was not being detected.

In some implementations, the system 200 can include a device detecting engine 216 that can determine whether a device, such as a peripheral device, is present within a distance of the computing device 202, such that the computing device 202 can establish a wireless connection with the device. For example, the device detecting engine 216 can be a module that is part of the automated assistant 204, or separate from the automated assistant 204, and can determine whether the computing device 202 has received a beacon signal from a peripheral device. In some implementations, the device detecting engine 216 can determine whether the beacon signal was received from a peripheral device that can control or other interface with the automated assistant. When the device detecting engine 216 determines that a peripheral device is available for connecting with the computing device 202, the device detecting engine 216 can interact with a sequence generating engine 218 to generate connection sequence data.

Connection sequence data generated by the sequence generating engine 218 can indicate a priority that certain applications have over other applications when requesting to connect with the peripheral device detected by the device detecting engine 216. In some implementations, the connection sequence data can be generated based on the sequence generating engine 218 determining whether the applications 234 include a designated application for the peripheral device. When the applications 234 are determined to include the designated application for the peripheral device, the connection sequence data can be generated to prioritize connecting the designated application with the peripheral device over connecting the automated assistant 204 with the peripheral device. In some implementations, the connection sequence data can be generated with further instructions for each application that has successfully connected to the peripheral device to, upon completion of connecting, provide an indication of the completion to another application having the next priority. In some implementations, the connection sequence data can be different over time for a peripheral device according to characteristics that are exhibited when certain applications connect to the peripheral device. For example, an application that has exhibited a threshold number of timeouts when trying to connect with the peripheral device can have a lower priority the next time the connection sequence data is generated for the peripheral device. Thereafter, should the number of timeouts or other characteristics improve for the lower priority application, the priority of the application can be assigned a relatively higher priority the next time the connection sequence data is generated for the peripheral device.

In some implementations, the system 200 can include a profile connection engine 226 that can control whether certain profiles of the automated assistant and/or another application 234 will be connected or disconnected to a peripheral device. For example, when the device detecting engine 216 receives an indication that a peripheral device is available, the profile connection engine 226 can determine whether the automated assistant 204 is already connected with the peripheral device via a particular profile (e.g., a hands-free profile) and/or whether any other profile is available for utilizing with the peripheral device. When the profile connection engine 226 determines that the automated assistant 204 is already connected with the peripheral device and/or another profile is not available for connecting with the peripheral device, the profile connection engine 226 can cause the automated assistant 204 to bypass attempting to re-connect with the peripheral device. In other words, although connection sequence data may or may not be generated in response to detecting the peripheral device, the automated assistant and/or any other relevant application can bypass attempting to re-connect with the peripheral device according to the connection sequence data.

In some implementations, the system 224 can include a state machine engine 224 that can generate state machine data, which can be synched with multiple different devices and/or applications. The state machine engine 224 can adapt the state machine data over time as applications 234 and/or the automated assistant 204 connect or disconnect with different devices and/or utilize different profiles with different devices. In this way, an operating system of a computing device that is being solicited to connect with a peripheral device, and/or an operating system of the peripheral device, can maintain a synced record of connection statuses of devices and applications, and/or the respective profiles being utilized for the corresponding connections.

Figure 3:
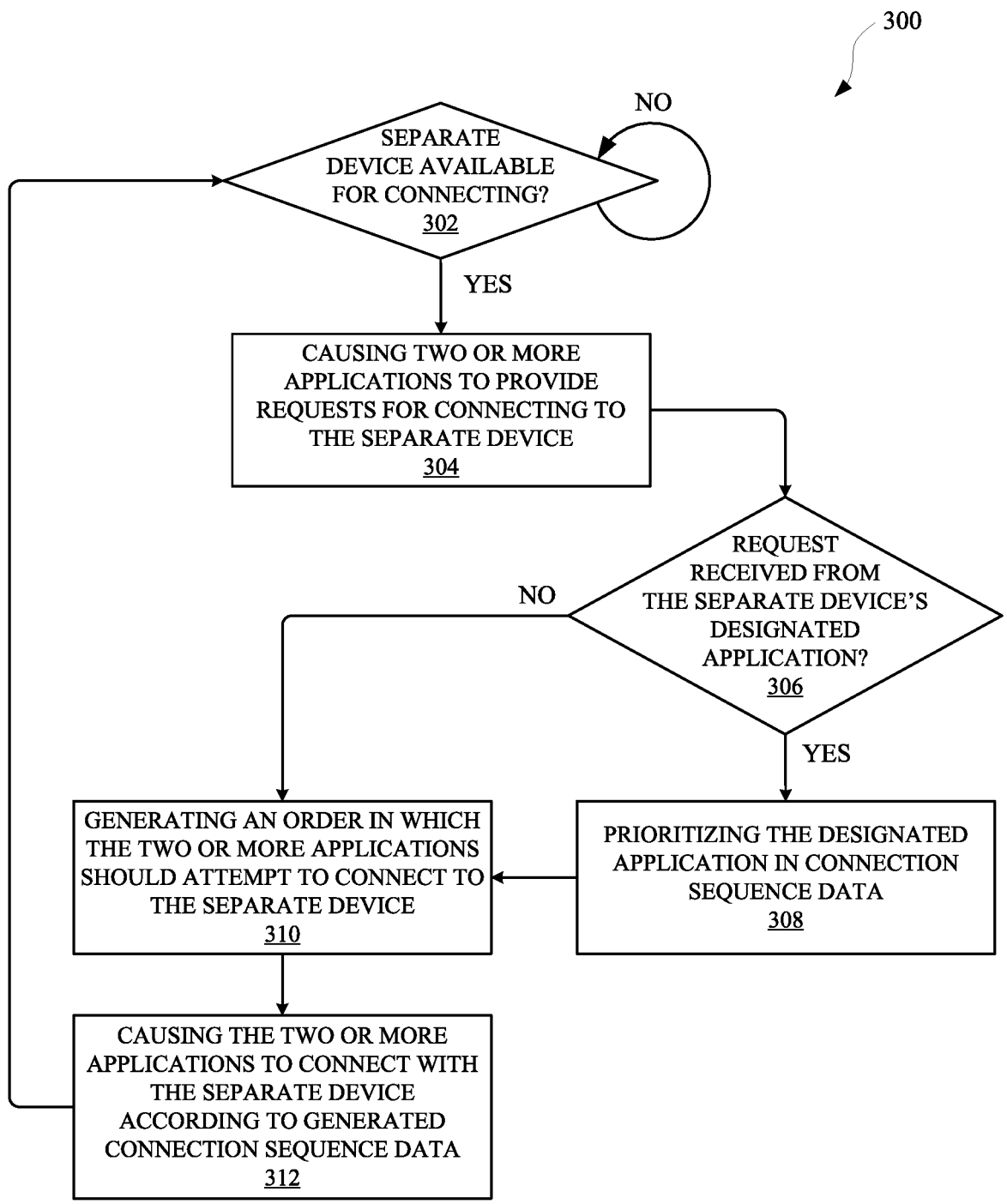
FIG. 3 illustrates a method for sequencing connections of applications, which include an automated assistant, to one or more peripheral devices to prioritize a designated application for initially connecting with the one or more peripheral devices.

FIG. 3 illustrates a method 300 for sequencing connections of applications, which include an automated assistant, to one or more peripheral devices to prioritize a designated application for initially connecting with the one or more peripheral devices. The method 300 can be performed by one or more computing devices, applications, and/or any other apparatus or module that can be associated with an automated assistant. The method 300 can include an operation 302 of determining whether a separate device is available for connecting to a computing device that includes two or more applications. The computing device can be, but is not limited to a cellular phone or other smart device, and the separate device can include another computing device that can communicate with the computing device via one or more communication protocols (e.g., Bluetooth Classic communication protocol, Bluetooth Low Energy communication protocol, etc.). The separate device can be determined to be available for connecting with the computing device in response to receiving a beacon signal or other data from the separate device, and/or based on the computing device otherwise detecting the separate device. When the separate device is determined to be available, the method 300 can proceed from the operation 302 to an operation 304. Otherwise, the computing device or application of the computing device can continue to determine whether a separate device is available.

The operation 304 can include causing two or more applications to provide requests for connecting to the separate device. In some implementations, the two or more applications can include a designated application that is provided by a third party entity that also provides (e.g., sells or manufactures) the separate device, and an automated assistant application that can be responsive to inputs at the separate device and the computing device. The requests can be provided from the two or more applications in response to the two or more applications receiving data from an operating system of the computing device, from the separate device via another wireless communications modality (e.g., Wi-Fi), and/or from another application or device. For example, data received from the separate device can indicate profiles that can be operated via the separate device, therefore certain applications may provide requests according to whether they can be controlled according to such profiles.

The method 300 can proceed from the operation 304 to an operation 306 of determining whether a request has been received from the designated application for the separate device. When, for example, the separate device is an exercise device for generating exercise data during an exercise routine, the designated application can be an exercise application that processes the exercise data. Therefore, the exercise application can provide a request to connect with the separate device, and the request can be considered as originating from an application that is designated for the separate device. Based on this request being received from the designated application, the method 300 can proceed from the operation 306 to an operation 308. Otherwise, the method 300 can proceed from the operation 306 to an operation 310.

The operation 308 can include prioritizing the designated application in connection sequence data, which can be utilized to determine a connection sequence for connecting the two or more applications to the separate device. In some implementations, connection sequence data can be generated to indicate a priority or order in which applications should connect to a separate device that is available for connecting. In this way, each application may not connect to the separate device until an application of higher priority has completed a connection process with the separate device. When the designated application is indicated as the priority application for connecting with the separate device, the method 300 can proceed from the operation 308 to the operation 310.

The operation 310 can include generating an order in which the two or more applications should attempt to connect to the separate device. In some implementations, the order can be characterized by connection sequence data that can be generated by an operating system of the separate device and/or the computing device, and/or any other application that is associated with the separate device and/or the computing device. The order can prioritize the designated application over an automated assistant that is accessible via the computing device and is controllable via the separate device. In this way, the automated assistant can at least temporarily bypass attempting to connect to the separate device until the designated application has completed a connection process with the separate device. In some implementations, the sequencing data can also include instructions for directing each application that is going to connect with the separate device to communicate with one or more other applications that are in the sequence to connect with the separate device. In this way, each application can be on notice that connections are occurring, or not occurring, and can initialize their respective connection process when they receive notice that the separate device is ready for them to connect.

The method 300 can proceed from the operation 310 to an operation 312 of causing the two or more applications to connect with the separate device according to the generated connection sequence data. In some implementations, the two or more applications can initialize connecting with the separate device by first allowing the designated application to establish an encrypted communication channel with the separate device. Thereafter, another application, such as the automated assistant, can establish a separately encrypted communication channel with the separate device. By sequencing the creation of encrypted channels, computational resources can be preserved, considering that establishing such encrypted channels can consume memory and processing bandwidth. In some implementations, the two or more applications can initialize connecting with the separate device by first allowing the designated application to connected with the separate device via a Bluetooth Classic protocol (or other protocol), and allowing other applications to connect via the Bluetooth Classic protocol or a different protocol.

Figure 4:
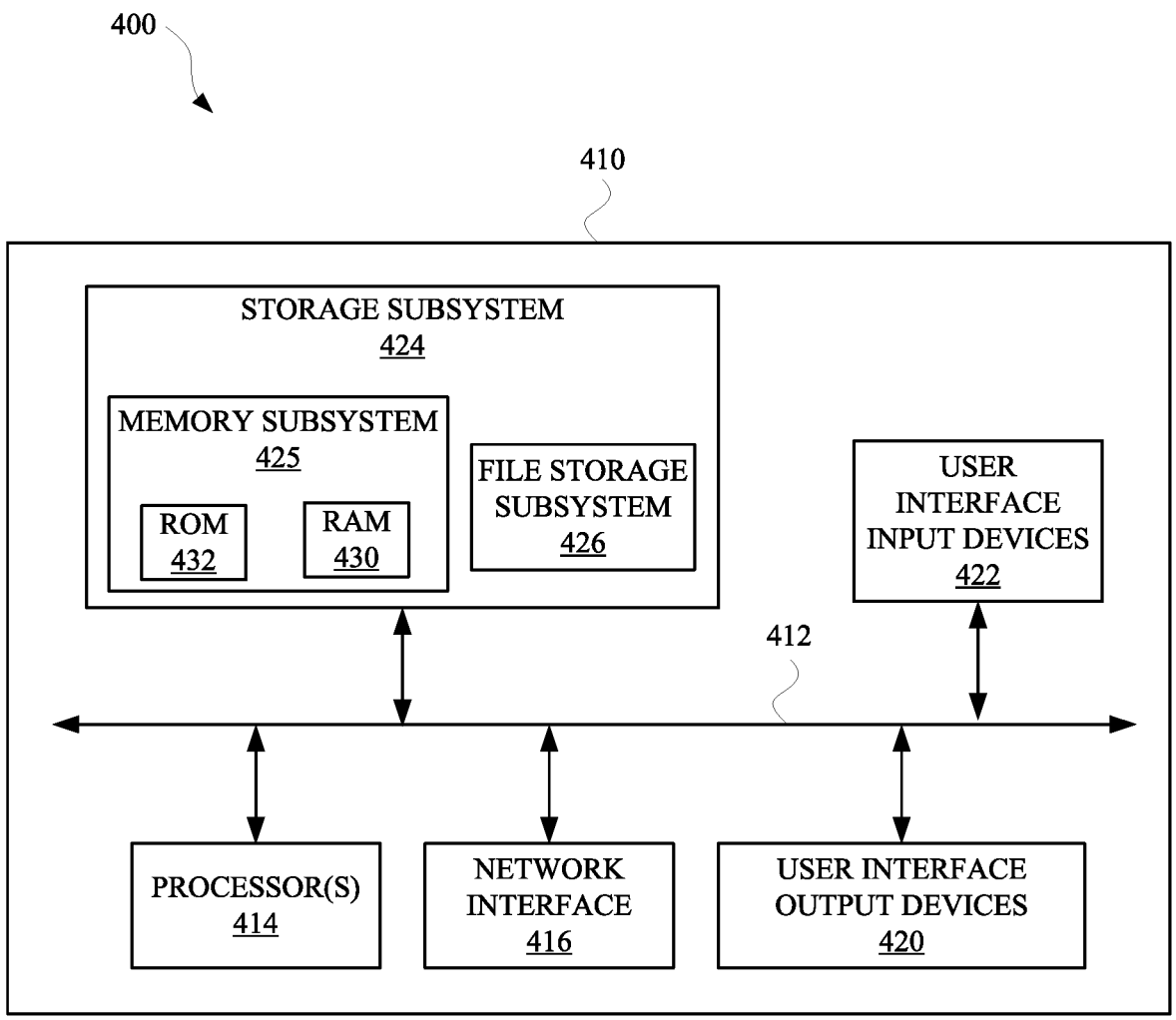
FIG. 4 is a block diagram of an example computer system.

FIG. 4 is a block diagram 400 of an example computer system 410. Computer system 410 typically includes at least one processor 414 which communicates with a number of peripheral devices via bus subsystem 412. These peripheral devices may include a storage subsystem 424, including, for example, a memory 425 and a file storage subsystem 426, user interface output devices 420, user interface input devices 422, and a network interface subsystem 416. The input and output devices allow user interaction with computer system 410. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices.

In general, use of the term "input device" is intended to include all possible types of devices and ways to input information into computer system 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein. For example, the storage subsystem 424 may include the logic to perform selected aspects of method 300, and/or to implement one or more of system 200, computing device 104, automated assistant, peripheral device 112, and/or any other application, device, apparatus, and/or module discussed herein.

These software modules are generally executed by processor 414 alone or in combination with other processors. Memory 425 used in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computer system 410 communicate with each other as intended. Although bus subsystem 412 is shown schematically as a single bus, alternative implementations of the bus subsystem may use multiple busses.

Computer system 410 can be of varying types including a workstation, server, computing cluster, blade server, server farm, or any other data processing system or computing device. Due to the ever-changing nature of computers and networks, the description of computer system 410 depicted in FIG. 4 is intended only as a specific example for purposes of illustrating some implementations. Many other configurations of computer system 410 are possible having more or fewer components than the computer system depicted in FIG. 4.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including operations such as determining that a peripheral device is available for connecting with a computing device, wherein the computing device includes an automated assistant application that provides access to an automated assistant, and the peripheral device includes an interface for a user to interact with the automated assistant when the automated assistant application is connected to the peripheral device. The method can further include causing, based on the peripheral device being available for connecting with the computing device, two or more applications of the computing device to provide requests for connecting to the peripheral device, wherein the two or more applications include the automated assistant application. The method can further include providing, based on the requests from the two or more applications, connection sequence data to the automated assistant application, wherein the connection sequence data directs the automated assistant application to connect with the peripheral device after a separate application of the two or more applications has connected with the peripheral device. The method can further include causing, in response to providing the connection sequence data to the automated assistant application, the automated assistant to connect with the peripheral device after the separate application of the two or more applications has connected with the peripheral device.

In some implementations, the separate application connects with the peripheral device via a channel that is encrypted differently from another channel that the automated assistant connects with the peripheral device. In some implementations, the automated assistant application is provided by an entity that is different from a separate entity that provides the separate application and the peripheral device. In some implementations, the separate application connects with the peripheral device via a Bluetooth Classic protocol and the automated assistant application connects with the peripheral device via a Bluetooth Low Energy protocol. In some implementations, causing the automated assistant application to connect with the peripheral device after the separate application of the two or more applications has connected with the peripheral device includes: causing the automated assistant application to connect with the peripheral device in response to the automated assistant application receiving a connection confirmation from the separate application of the two or more applications.

In some implementations, causing the automated assistant application to connect with the peripheral device after the separate application of the two or more applications has connected with the peripheral device includes: causing the automated assistant application to connect with the peripheral device in response to the automated assistant application receiving a connection confirmation from the peripheral device. In some implementations, the connection confirmation indicates that the peripheral device completed connecting with the separate application, and the connection confirmation is communicated to the automated assistant application over a different communication modality than the peripheral device is connected with the separate application.

In other implementations, a method implemented by one or more processors is set forth as including operations such as determining, at a computing device, that a peripheral device is available for connecting with the computing device, wherein, when the peripheral device is in communication with the computing device, the peripheral device selectively communicates according to a first communication protocol with a designated application of the computing device, and selectively communicates according to a second communication protocol with a separate application of the computing device. The method can further include providing, based on the peripheral device being available for connecting with the computing device, connection sequence data to the separate application of the computing device, wherein the sequencing data directs the separate application to connect with the peripheral device after the designated application of the computing device has connected, according to the first communication protocol, with the peripheral device. The method can further include causing, by the computing device, the separate application to connect with the peripheral device via the second communication protocol after the designated application has connected with the peripheral device via the first communication protocol.

In some implementations, the first communication protocol includes a Bluetooth Classic protocol, and the second communication protocol includes a Bluetooth Low Energy protocol. In some implementations, the separate application includes an automated assistant application that connects with the peripheral device via the Bluetooth Classic Protocol and the Bluetooth Low Energy protocol. In some implementations, causing the separate application to connect with the peripheral device via the second communication protocol after the designated application has connected with the peripheral device via the first communication protocol includes: providing, to the separate application, an indication that the designated application has completed connecting with the peripheral device via the first communication protocol.

In yet other implementations, a method implemented by one or more processors is set forth as including operations such as determining, by a peripheral device, that a computing device is available for connecting with the peripheral device via a wireless communications modality, wherein the computing device provides access to an automated assistant application that is responsive to spoken utterances from a user. The method can further include providing, based on the computing device being available for connecting with the peripheral device, connection sequence data to the computing device, wherein the connection sequence data indicates a sequence for at least a designated application and an automated assistant application of the computing device to connect with the peripheral device. The method can further include receiving, from the computing device, a request for the designated application to connect with the peripheral device via a first communication channel that is established via the wireless communications modality. The method can further include causing, in response to receiving the request, the designated application to connect with the peripheral device via the first communication channel. The method can further include causing, based on the peripheral device connecting with the designated application, the designated application or the peripheral device to provide an indication, to the automated assistant application, that the designated application is connected to the peripheral device. The method can further include causing, based on the connection sequence data, the automated assistant application to connect with the peripheral device via a second communication channel in response to the automated assistant application receiving the indication that the designated application is connected to the peripheral device.

In some implementations, the peripheral device includes an interface for receiving the spoken utterances for the automated assistant application when the automated assistant application is connected to the peripheral device via the second communication channel. In some implementations, the peripheral device controls the designated application according to a first profile when the peripheral device is connected with the designated application, and the peripheral device controls the automated assistant application according to a second profile, that is different than the first profile, when the peripheral device is connected with the automated assistant application. In some implementations, the first profile includes a streaming profile and the second profile includes a hands-free profile. In some implementations, causing the designated application or the peripheral device to provide the indication to the automated assistant application includes: causing the indication to be provided over a separate wireless communications modality from the wireless communications modality.

In some implementations, the wireless communications modality includes Bluetooth and the separate wireless communications modality includes Wi-Fi. In some implementations, the first wireless communications channel operates according to a Bluetooth Classic protocol, and the second wireless communications channel operates according to a Bluetooth Low Energy protocol. In some implementations, the method can further include generating, based on the designated application and the automated assistant application connecting with the peripheral device, state machine data, wherein the state machine data characterizes a connection status of the designated application with the peripheral device and a separate connection status of the automated assistant application with the peripheral device. In some implementations, the method can further include providing, by the peripheral device, the state machine data to the computing device via the wireless communications modality or a separate wireless communications modality.

We claim:

1. A method implemented by one or more processors, the method comprising:
   determining that a peripheral device is available for connecting with a computing device,
      wherein the computing device includes an automated assistant application that provides access to an automated assistant, and the peripheral device includes an interface for a user to interact with the automated assistant when the automated assistant application is connected to the peripheral device;
   causing, based on the peripheral device being available for connecting with the computing device, two or more applications of the computing device to provide requests for connecting to the peripheral device,
      wherein the two or more applications include the automated assistant application;
   providing, based on the requests from the two or more applications, connection sequence data to the automated assistant application,
      wherein the connection sequence data directs the automated assistant application to connect with the peripheral device after a separate application of the two or more applications has connected with the peripheral device; and
   causing, in response to providing the connection sequence data to the automated assistant application, the automated assistant to connect with the peripheral device after the separate application of the two or more applications has connected with the peripheral device.

2. The method of claim 1, wherein the separate application connects with the peripheral device via a channel that is encrypted differently from another channel that the automated assistant connects with the peripheral device.

3. The method of claim 1, wherein the automated assistant application is provided by an entity that is different from a separate entity that provides the separate application and the peripheral device.

4. The method of claim 1, wherein the separate application connects with the peripheral device via a Bluetooth Classic protocol and the automated assistant application connects with the peripheral device via a Bluetooth Low Energy protocol.

5. The method of claim 1, wherein causing the automated assistant application to connect with the peripheral device after the separate application of the two or more applications has connected with the peripheral device includes:
   causing the automated assistant application to connect with the peripheral device in response to the automated assistant application receiving a connection confirmation from the separate application of the two or more applications.

6. The method of claim 1, wherein causing the automated assistant application to connect with the peripheral device after the separate application of the two or more applications has connected with the peripheral device includes:
   causing the automated assistant application to connect with the peripheral device in response to the automated assistant application receiving a connection confirmation from the peripheral device.

7. The method of claim 6, wherein the connection confirmation indicates that the peripheral device completed connecting with the separate application, and the connection confirmation is communicated to the automated assistant application over a different communication modality than the peripheral device is connected with the separate application.

8. A method implemented by one or more processors, the method comprising:
   determining, at a computing device, that a peripheral device is available for connecting with the computing device,
      wherein, when the peripheral device is in communication with the computing device, the peripheral device selectively communicates according to a first communication protocol with a designated application of the computing device, and selectively communicates according to a second communication protocol with a separate application of the computing device;
   providing, based on the peripheral device being available for connecting with the computing device, connection sequence data to the separate application of the computing device,
      wherein the connection sequence data directs the separate application to connect with the peripheral device after the designated application of the computing device has connected, according to the first communication protocol, with the peripheral device; and
   causing, by the computing device, the separate application to connect with the peripheral device via the second communication protocol after the designated application has connected with the peripheral device via the first communication protocol.

9. The method of claim 8, wherein the first communication protocol includes a Bluetooth Classic protocol, and the second communication protocol includes a Bluetooth Low Energy protocol.

10. The method of claim 9, wherein the separate application includes an automated assistant application that connects with the peripheral device via the Bluetooth Classic Protocol and the Bluetooth Low Energy protocol.

11. The method of claim 8, wherein causing the separate application to connect with the peripheral device via the second communication protocol after the designated application has connected with the peripheral device via the first communication protocol includes:
   providing, to the separate application, an indication that the designated application has completed connecting with the peripheral device via the first communication protocol.

12. A method implemented by one or more processors, the method comprising:
   determining, by a peripheral device, that a computing device is available for connecting with the peripheral device via a wireless communications modality,
      wherein the computing device provides access to an automated assistant application that is responsive to spoken utterances from a user;
   providing, based on the computing device being available for connecting with the peripheral device, connection sequence data to the computing device,
      wherein the connection sequence data indicates a sequence for at least a designated application and an automated assistant application of the computing device to connect with the peripheral device;
   receiving, from the computing device, a request for the designated application to connect with the peripheral device via a first communication channel that is established via the wireless communications modality;
   causing, in response to receiving the request, the designated application to connect with the peripheral device via the first communication channel;
   causing, based on the peripheral device connecting with the designated application, the designated application or the peripheral device to provide an indication, to the automated assistant application, that the designated application is connected to the peripheral device; and causing, based on the connection sequence data, the automated assistant application to connect with the peripheral device via a second communication channel in response to the automated assistant application receiving the indication that the designated application is connected to the peripheral device.

13. The method of claim 12, wherein the peripheral device includes an interface for receiving the spoken utterances for the automated assistant application when the automated assistant application is connected to the peripheral device via the second communication channel.

14. The method of claim 12, wherein the peripheral device controls the designated application according to a first profile when the peripheral device is connected with the designated application, and the peripheral device controls the automated assistant application according to a second profile, that is different than the first profile, when the peripheral device is connected with the automated assistant application.

15. The method of claim 14, wherein the first profile includes a streaming profile and the second profile includes a hands-free profile.

16. The method of claim 12, wherein causing the designated application or the peripheral device to provide the indication to the automated assistant application includes:

causing the indication to be provided over a separate wireless communications modality from the wireless communications modality.

17. The method of claim 16, wherein the wireless communications modality includes Bluetooth and the separate wireless communications modality includes Wi-Fi.

18. The method of claim 17, wherein the first communication channel operates according to a Bluetooth Classic protocol, and the second communication channel operates according to a Bluetooth Low Energy protocol.

19. The method of claim 12, further comprising:

generating, based on the designated application and the automated assistant application connecting with the peripheral device, state machine data,
wherein the state machine data characterizes a connection status of the designated application with the peripheral device and a separate connection status of the automated assistant application with the peripheral device.

20. The method of claim 19, further comprising:

providing, by the peripheral device, the state machine data to the computing device via the wireless communications modality or a separate wireless communications modality.

* * * * *